United States Patent [19]

Shibuya et al.

[11] Patent Number: 4,825,724
[45] Date of Patent: May 2, 1989

[54] DIFFERENTIAL GEAR

[75] Inventors: Kazunori Shibuya; Tetsuro Hamada; Katsuhiko Masuda; Kazuhiko Shimada, all of Wako, Japan

[73] Assignee: Honda Giken Kogyo Kabushiki Kaisha, Tokyo, Japan

[21] Appl. No.: 84,247

[22] Filed: Aug. 12, 1987

[30] Foreign Application Priority Data

Aug. 18, 1986 [JP] Japan .................................. 61-191591

[51] Int. Cl.4 ............................................... F16H 1/44
[52] U.S. Cl. ...................................... 74/710.5; 74/711
[58] Field of Search ................................ 74/710.5, 711

[56] References Cited

U.S. PATENT DOCUMENTS

| 1,066,958 | 7/1913 | Stoddard | 74/710.5 |
| 1,431,535 | 10/1922 | MacDonald | 74/710.5 |
| 3,008,350 | 11/1961 | Misener | 74/710.5 |
| 3,499,348 | 3/1970 | Hartupee | 74/710.5 |

FOREIGN PATENT DOCUMENTS

| 3609293 | 8/1986 | Fed. Rep. of Germany | 74/710.5 |
| 80122 | 6/1919 | Switzerland | 74/710.5 |

Primary Examiner—Dirk Wright
Attorney, Agent, or Firm—Armstrong, Nikaido, Marmelstein, Kobovcik & Murray

[57] ABSTRACT

An improvement is provided in a differential gear which includes an input shaft, a differential casing adapted to be rotated by the input shaft, a differential pinion shaft radially extending within the differential casing and a plurality of differential pinion gears rotatably mounted on the differential pinion shaft. A pair of side gears having a rotation axis common to that of the differential casing and meshing with the pinion gears, and a pair of output shafts fixed to the side gears. The improvement comprises a centrifugal weight member slidably mounted on the differential pinion shaft and radially inwardly biased, and a multiple disc clutch provided between the differential casing and the output shafts. The clutch is adapted to be engaged in response to the radially outward movement of the centrifugal weight member.

4 Claims, 1 Drawing Sheet

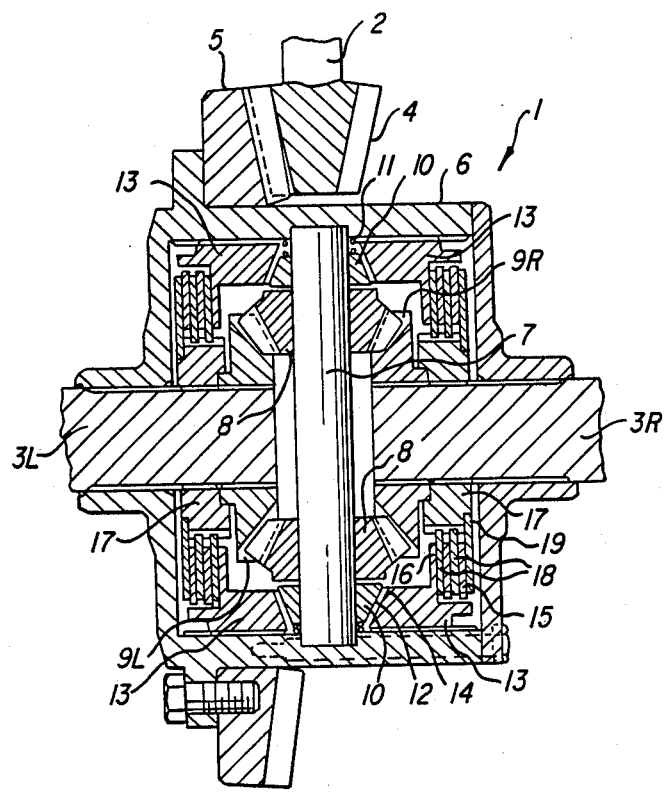

DIFFERENTIAL GEAR

BACKGROUND OF THE INVENTION

1. Field of the Invention

The present invention relates to a differential gear for transmitting torque from one input shaft to two output shafts and effecting differentiation between the two output shafts with different rotational speeds.

2. Description of the Prior Art

In a vehicle such as an automobile having a pair of right and left driving wheels, a differential gear is used for the purpose of transmitting engine power to both the driving wheels. In turning the vehicle, there is a difference in the rolling distance between the right and left driving wheels due to a difference in the turning radius. This difference causes the slip of one of the driving wheels. To prevent this slip, the differential gear effects differentiation between the driving wheels.

Generally, the differential gear employs a differential mechanism comprising a differential casing, a differential pinion gear and a side gear. In this differential gear, the same torque is always transmitted to both the driving wheels. Therefore, when one of the driving wheels sticks in the mud, snow or icy road, the torque transmitted to the other driving wheel is decreased, causing a reduction in operating performance. To overcome this problem, a limited slip differential has been proposed for generating an effective friction torque in the differential gear and increasing the torque to be transmitted to a driving wheel when rotating at lower speeds.

A conventional limited slip differential includes a torque proportional type limited slip differential having a cam mechanism on a differential pinion shaft portion for generating a thrust force and a multiple disc clutch friction mechanism for generating a differential resistance upon application of the thrust force. Japanese Patent Laid-open No. 51-89068 discloses a speed responsive differential mechanism having a friction clutch adapted to be engaged in response to a difference in speed between a differential casing and a side gear.

The torque proportional type limited slip differential is designed to limit differentiation by utilizing a thrust force generated by a transmitted torque. Accordingly, when torque is applied during a sharp turn at low speeds, the differentiation is limited and slip is created. Further, it is desirable to limit the differentiation between both driving wheels during straight movement at high speeds, to ensure stability in running. However, since the torque is small during high-speed running, the limitation of differentiation is not effected. When one of the driving wheels is in a complete slipping condition, torque is not transmitted, and the limitation of differentiation is not effected. Accordingly, it is impossible to transmit torque to the other driving wheel and get out of the slipping condition.

While the speed responsive differential mechanism disclosed in Japanese patent Laid-open No. 51-89068 is responsive to speed rather than torque, it is responsive to a difference in speed between the differential casing and the side gear, but not responsive to a vehicle speed. Therefore, it is impossible to limit the differentiation between both driving wheels during straight movement at high speeds and thereby improve the running stability.

SUMMARY OF THE INVENTION

It is an object of the present invention to provide a differential gear which can limit the differentiation between the right and left driving wheels during high-speed operation of a vehicle to thereby improve the stability of straight movement.

It is another object of the present invention to provide a differential gear which can limit the differentiation between the right and left driving wheels when one of the driving wheels is in a slipping condition during low-speed operation to thereby easily overcome the slipping condition.

The present invention is directed to a differential gear including an input shaft, a differential casing adapted to be rotated by the input shaft and a differential pinion shaft radially extending within the differential casing. A plurality of differential pinion gears are rotatably mounted on the differential pinion shaft and a pair of side gears having an axis of rotation common to that of the differential casing mesh with the pinion gears. A pair of output shafts are fixed to the side gears. The present invention includes the improvement comprising a centrifugal weight member slidably mounted on the differential pinion shaft and radially inwardly biased, and a multiple disc clutch provided between the differential casing and the output shafts and adapted to be engaged in accordance with the radially outward movement of the centrifugal weight member.

In this arrangement, the centrifugal weight member is mounted on the differential pinion shaft and is designed to rotate with the differential casing and to move radially outwardly when a centrifugal force to be applied to the centrifugal weight member overcomes a biasing force of a spring or the like. As a result, the multiple disc clutch is engaged to apply a differentiation limiting torque between the differential casing and the output shafts. That is, the differentiation between the output shafts is limited when the rotational speed of the differential casing or the input shaft is large. Accordingly, during high-speed operation of a vehicle including a differential gear of the present invention, the differentiation between the right and left driving wheels is limited, thereby ensuring stable movement. During low-speed operation of the vehicle, the differentiation between the driving wheels is not limited, thereby preventing slip of the driving wheels even during sharp turns. Furthermore, in the event that one of the driving wheels is in a slipping condition, the rotational speed of the input shaft is increased because of the decrease in torque, thus limiting the differentiation and thereby overcoming the slipping condition. Still further, the biasing force to be applied to the centrifugal weight member may be changed to change the engaging force of the multiple disc clutch, thus easily obtaining a limited slip differential having various characteristics. In addition, since the centrifugal weight member is mounted on the differential pinion shaft within the differential casing, the differential gear may have a compact construction.

Other objects and features of the invention will be more fully understood from the following detailed description and appended claims when taken with the accompanying drawings.

BRIEF DESCRIPTION OF THE DRAWING

The FIGURE is a sectional view of the differential gear of the preferred embodiment of the present invention.

DETAILED DESCRIPTION OF THE PREFERRED EMBODIMENT

Referring to the drawing which shows the preferred embodiment of the present invention, a differential gear 1 is provided between a drive shaft 2 of a vehicle and right and left axle shafts 3R and 3L. The drive shaft 2 is an input shaft, and the axle shafts 3R and 3L are output shafts. A reduction pinion gear 4, formed at an end portion of the drive shaft 2, meshes with a reduction ring gear 5. The ring gear 5 is fixed to a differential casing 6. A differential pinion shaft 7, perpendicular to the rotational axis of the ring gear 5, is rotatably engaged with the differential casing 6. A plurality of differential pinion gears 8, e.g., two or four gears are fixed on the pinion shaft 7. The pinion gears 8 mesh with a side gear 9L mounted on the left axle shaft 3L and with a side gear 9R mounted on the right axle shaft 3R.

As is well known in such a differential gear, the driving torque of the drive shaft 2 is evenly transmitted to the axle shafts 3L and 3R, and each element from the differential casing 6 to the axle shafts 3 is normally rotated as a unit. However, in turning the automobile, the pinion gears 8 are rotated about the axis of the pinion shaft 7 to effect differentiation of the axle shafts 3L and 3R (to rotate the axle shafts at different rotational speeds). In another situation when a load applied to one axle shaft, e.g., the left axle shaft 3L, differentiation between the axle shafts 3L and 3R is also generated to rotate the axle shaft 3L at high speeds and rotate the axle shaft 3R at low speeds. At this time, the torque to be transmitted to the axle shaft 3R is limited and reduced by the torque to be transmitted to the axle shaft 3L. Thus, a limited slip differential is provided to limit the differentiation between the axle shafts 3L and 3R and thereby increase the torque to be transmitted to the axle shaft 3R.

The limited slip differential in this embodiment includes a pair of centrifugal weight members 10 each slidably engaged with the pinion shaft 7 between the inner surface of the differential casing 6 and the pinion gear 8, and radially inwardly biased by a spring 11. Each centrifugal weight member 10 is formed in a wedge shape having a pair of inclined surfaces 12. A pair of clutch outer members 12 are adjacent the right and left sides of each centrifugal weight member 10. Each clutch outer member 13 is splined on the inner surface of the differential casing 6 in such a manner as to be slidable in the direction of the rotational axis of the differential casing 6, and is rotatable with the differential casing 6. Each clutch outer member 13 is formed with an inclined surface 14 which engages the inclined surface 12 of the centrifugal weight member 10. When the centrifugal weight member 10 is moved radially outwardly against the biasing force of the spring 11, the right and left clutch outer members 13 are urged axially outwardly by the weight member 10. A plurality of annular clutch outer discs 15 are axially, movably splined to the outer end portion of the clutch outer member 13, and a pressure plate 16 is integrally formed with the clutch outer member 13 on the inside of the clutch outer discs 15.

Clutch inner members 17 are fixed to the axle shafts 3L and 3R at positions radially opposed to the clutch outer members 13. A plurality of annular clutch inner discs 18 are axially, movably splined to the outer circumference of each clutch inner member 17, and a pressure plate 19 is fixed to each group of the clutch inner discs 18. The clutch inner discs 18 and the clutch outer discs 15 are alternately arranged, and are pressed by the pressure plates 16 and 19 to engage one another.

In operation, when the rotational speed of engine torque transmitted from an engine through the drive shaft 2 to the differential casing 6 is high, the centrifugal force applied to the centrifugal weight members 10 overcomes the biasing force of the springs 11 to radially, outwardly move the centrifugal weight members 10. As a result, the clutch outer member 13 engages, through the inclined surfaces 12 and 14, the centrifugal weight members 10 which are moved axially outwardly, and accordingly, the pressure plates 16 of the clutch outer members 13 are moved to urge the clutch outer discs 15 and the clutch inner discs 18 to the pressure plates 19. Thus, the engine torque is directly transmitted through the clutch outer discs 15 and the clutch inner discs 18 to the axle shafts 3L and 3R to thereby limit the differentiation of the axle shafts 3L and 3R. In operating the vehicle at high speeds, the differentiation of the axle shafts is limited in the above-mentioned manner to ensure stable operation.

In turning the vehicle, e.g., U-turn or small turn at low speeds with a large difference in rotational speed of both axle shafts, the centrifugal force to be applied to the centrifugal weight members 10 is small, and the centrifugal weight members 10 are urged radially inward by the springs 11. As a result, a clutch engaging force is not transmitted through the clutch outer members 13 to the clutch discs 15 and 18, and thus, the clutch discs 15 and 18 are disengaged. Accordingly, differentiation between the axle shafts is freely generated.

However, when one of the axle shafts, e.g., the axle shaft 3L is in a slipping condition during low-speed operation, the engine speed is increased because of the loss of torque, causing high-speed rotation of the differential casing 6. Accordingly, the clutch is engaged to effectively transmit the engine torque to the other axle shaft 3R, thus easily eliminating the slipping condition.

The engaging force of the multiple disc clutch consisting of the clutch outer discs 15 and the clutch inner discs 18 may be changed by changing the strength of the springs 11. Accordingly, it is possible to obtain a limited slip differential having various characteristics. Furthermore, this limited slip differential may be compactly installed in the differential casing 6.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A differential gear for permitting a difference in rotational speed between two output shafts, said differential gear including an input shaft and two output shafts, the improvement comprising means for limiting the difference in rotational speed between said two output shafts in response to the rotational speed of said input shaft, said rotational speed limiting means comprising a differential casing coupled to said input shaft and adapted to be rotated by said input shaft, a differential pinion shaft radially extending within said differential casing and rotatably mounted at its opposite ends in said differential casing, a plurality of differential pinion gears rotatably mounted on said differential pinion shaft, and a pair of side gears having a rotational axis common to that of said differential casing, wherein said side gears mesh with said differential pinion gears and said two output shafts are fixed to said side gears, said means for limiting the difference in rotational speed between said two output shafts comprising a weight means radially movable in said differential casing, said weight means limiting the difference in rotational speed between said two output shafts in response to the centrifugal force applied to said weight means, said weight means being slidably mounted on said differential pinion shaft and being biased radially inwardly.

2. A differential gear as set forth in claim 1, wherein said means for limiting the difference in rotational speed between said two output shafts includes a multiple disc clutch means provided between said differential casing and said output shafts, wherein said clutch means is engaged in response to the radial outward movement of said weight means.

3. A differential gear as set forth in claim 4, wherein said clutch means includes a clutch outer member positioned to be engaged by said weight means and splined to an inner surface of said differential casing, wherein said outer member is slidable in axial direction of said differential casing in response to the radial movement of said weight means.

4. A differential gear as set forth in claim 3, wherein said weight means and said clutch outer member have mating inclined surfaces, wherein said weight means and said clutch outer member contact each other along said inclined surface.

* * * * *